United States Patent [19]

Urabe et al.

[11] Patent Number: 5,446,770
[45] Date of Patent: Aug. 29, 1995

[54] TIME DIVISION DUPLEX TRANSCEIVER

[75] Inventors: Yoshio Urabe, Ibaraki; Hitoshi Takai, Osaka; Hidetoshi Yamasaki, Amagasaki, all of Japan

[73] Assignee: Matsushita Electric Industrial Co., Ltd., Kadoma, Japan

[21] Appl. No.: 218,664

[22] Filed: Mar. 28, 1994

[30] Foreign Application Priority Data

Mar. 31, 1993 [JP] Japan .................. 5-073198

[51] Int. Cl.[6] .......................... H04L 5/16; H04B 1/38
[52] U.S. Cl. ...................................... 375/219; 455/78
[58] Field of Search .................. 375/7, 8, 285; 370/29, 370/32; 455/75, 76, 78, 84, 86

[56] References Cited

U.S. PATENT DOCUMENTS

| | | | |
|---|---|---|---|
| 4,434,505 | 2/1984 | Gutleber | 455/50 |
| 4,520,474 | 5/1985 | Vilmur | 370/32 |
| 4,754,450 | 6/1988 | Lynk et al. | 370/29 |
| 5,020,051 | 5/1991 | Beesley et al. | 370/29 |
| 5,123,008 | 6/1992 | Beesley | 370/29 |
| 5,140,697 | 8/1992 | Igarashi | 455/54.1 |
| 5,187,722 | 2/1993 | Petty | 375/118 |
| 5,267,233 | 11/1993 | Bauerschmidt | 370/29 |
| 5,276,913 | 1/1994 | Lee et al. | 455/78 |
| 5,319,799 | 6/1994 | Morita | 370/32 |

FOREIGN PATENT DOCUMENTS

| | | |
|---|---|---|
| 0496498 | 7/1992 | European Pat. Off. . |
| 0500373 | 8/1992 | European Pat. Off. . |
| 2233029 | 9/1990 | Japan . |
| 3283924 | 12/1991 | Japan . |
| 4240924 | 8/1992 | Japan . |
| 4372233 | 12/1992 | Japan . |

Primary Examiner—Stephen Chin
Assistant Examiner—Don N. Vo
Attorney, Agent, or Firm—Renner, Otto, Boisselle & Sklar

[57] ABSTRACT

A transceiver for transmitting and receiving a signal having the same frequency according to a time-division includes a local oscillator for generating a local signal having a first frequency, a frequency converter for converting the local signal into a carrier signal, a modulator for modulating the carrier signal by using a transmitting baseband signal so as to generate a transmitting signal having a second frequency and a receiving section for receiving a receiving signal having the second frequency which is the same as that of the transmitting signal. The frequency convertor includes a fractional frequency convertor for converting a signal having an input frequency into a signal having an output frequency. Wherein, the output frequency is $n_2/n_1$ times the input frequency, where $n_1$ is an integer greater than 2, $n_2$ is an integer greater than 1, $n_1$ and $n_2$ being relatively prime, whereby the second frequency of the transmitting signal is not any integral multiple of the first frequency of the local signal. In receiving operation of the transceiver, the operation of the frequency convertor is terminated.

10 Claims, 7 Drawing Sheets

TIME DIVISION DUPLEX TRANSCEIVER

BACKGROUND OF THE INVENTION

1. Field of the Invention

The present invention relates to a time division duplex transceiver for alternately transmitting and receiving a signal having the same frequency.

2. Description of the Related Art

In conventional two-way radio communication systems, such as portable telephones, frequency division duplex (FDD) is often used. According to FDD, the radio communication system transmits a signal having a first frequency and receives a signal having a second frequency which is different from the first frequency. However, in recent years, since time-division multiplexing can be easily achieved with respect to a digital signal, time division duplex (TDD) has attracted considerable attention. According to TDD, the radio communication system alternately transmits and receives a signal having the same frequency. Compared with FDD, TDD is advantageous, for example, in that it is easy to allocate a frequency to each of a transmitting signal and receiving signal, and that transmitting and receiving efficiencies can be made substantially equal.

In a time division duplex transceiver, a transmitting frequency is identical with a receiving frequency. When a signal having the transmitting frequency is generated within the transceiver during the receiving operation of the transceiver, the signal is likely to enter the receiving section of the transceiver. This interferes with the receiving operation of the transceiver and deteriorates the receiving performance. Thus, during the receiving operation of the transceiver, it is necessary to completely terminate the generation of the signal having the transmitting frequency.

Furthermore, in cases where the transceiver is of a superheterodyne configuration and uses a local signal for frequency conversion in both of the transmitting and receiving sections of the transceiver, a transmitting intermediate frequency is identical with a receiving intermediate frequency. Thus, the above-described problem of deterioration in the receiving performance also arises when a signal having the transmitting intermediate frequency is generated during the receiving operation of the transceiver. In such a transceiver, therefore, it is necessary to completely terminate the generation of the signal having the transmitting intermediate frequency.

The generation of the transmitting signal can be prevented by terminating the operation of a transmitting local oscillator during the receiving operation of the transceiver. However, it is practically impossible to terminate the operation of the transmitting local oscillator during the receiving operation of the transceiver. This is because the local oscillator cannot be turned on and off rapidly enough to coincide with the high-speed alternation between transmission and reception in the transceiver. Thus, a common way of terminating the generation of the transmitting signal is as follows: During the receiving operation of the transceiver, with the transmitting local oscillator kept in operation, the signal line for the local signal or transmitting signal is electrically cut off, or a circuit which allows these signals to pass therethrough is disconnected from its power source, thereby terminating the generation of the transmitting signal. In this case, however, when the isolation of the electrically disconnected circuit is not sufficient, the generation of the transmitting signal cannot be completely terminated during the receiving operation of the transceiver. When the transmitting signal is generated during the receiving operation of the transceiver, the transmitting signal is likely to enter the receiving section of the transceiver. This interferes with the receiving operation of the transceiver, thereby deteriorating the receiving performance.

To prevent such deterioration in the receiving performance, there has been developed a time division transceiver including a local oscillator for producing a frequency of an integral multiple of a transmitting frequency which also includes a divider. For example, this type of transceiver is disclosed in Japanese Laid-Open Patent Publication No. 4-240924. In this transceiver, the output of the local oscillator is divided so as to obtain a signal having a transmitting frequency. During the receiving operation of the transceiver, with the local oscillator kept in operation, the divider is electrically disconnected from the local oscillator, thereby preventing the generation of the signal having the transmitting frequency.

In such a time division transceiver, however, the local signal from the local oscillator is required to have a frequency equal to or higher than twice that of the transmitting signal. When the transmitting signal has a higher frequency, it becomes more difficult to produce a stable local oscillator. This results in the cost for producing the transceiver to be high.

SUMMARY OF THE INVENTION

The transceiver of this invention for transmitting and receiving a signal having the same frequency according to a time-division includes: a local oscillator for generating a local signal having a first frequency; a frequency converter for converting the local signal into a carrier signal; a modulator for modulating the carrier signal by using a transmitting baseband signal so as to generate a transmitting signal having a second frequency; and a receiving section for receiving a receiving signal having the second frequency which is the same as that of the transmitting signal, wherein the frequency convertor includes a fractional frequency convertor for converting a signal having an input frequency into a signal having an output frequency, the output frequency being $n_2/n_1$ times the input frequency, where $n_1$ is an integer greater than 2, $n_2$ is an integer greater than 1, $n_1$ and $n_2$ being relatively prime, whereby the second frequency of the transmitting signal is not any integral multiple of the first frequency of the local signal, and wherein, in the receiving operation of the transceiver, the operation of the frequency converter is terminated.

In one embodiment of the invention, the fractional frequency converter includes at least one divider and at least one multiplier which are connected in series.

In another embodiment of the invention, the termination of the operation of the frequency converter is accomplished by terminating operation of the divider in the receiving operation of the transceiver.

In another embodiment of the invention, the termination of the operation of the divider is accomplished by interrupting a signal input to the divider in the receiving operation of the transceiver.

In another embodiment of the invention, the local signal is supplied to the receiving section, and the receiving section performs at least one of frequency conversion and detection of the receiving signal by using the local signal.

In another aspect of the present invention, a transceiver for transmitting and receiving a signal having the same frequency according to a time-division includes: a first local oscillator for generating a first local signal having a first frequency; a first frequency converter for converting the first local signal into a carrier signal; a modulator for modulating the carrier signal by using a transmitting baseband signal so as to generate a modulated signal having a second frequency; a second local oscillator for generating a second local signal having a third frequency; a second frequency converter for converting the modulated signal into a transmitting signal having a fourth frequency in accordance with the third frequency of the second local signal; a third frequency converter for converting a receiving signal having the fourth frequency which is the same as that of the transmitting signal into an intermediate-frequency signal in accordance with the third frequency of the second local signal; and a receiving section for receiving the intermediate-frequency signal, wherein the first frequency converter includes a fractional frequency converter for converting a signal having an input frequency into a signal having an output frequency, the output frequency being $n_2/n_1$ times the input frequency, where $n_1$ As an integer greater than 2, $n_2$ is an integer greater than 1, $n_1$ and $n_2$ being relatively prime, whereby the second frequency of the modulated signal is not any integral multiple of the first frequency of the first local signal, and wherein, An the receiving operation of the transceiver, the operation of the first frequency converter As terminated.

In one embodiment of the invention, the fractional frequency converter includes at least one divider and at least one multiplier which are connected in series.

In another embodiment of the invention, the termination of the operation of the first frequency converter is accomplished by terminating operation of the divider in the receiving operation of the transceiver.

In another embodiment of the invention, the termination of the operation of the divider is accomplished by interrupting a signal input to the divider in the receiving operation of the transceiver.

In another embodiment of the invention, the first local signal is supplied to the receiving section, and the receiving section performs at least one of frequency conversion and detection of the intermediate frequency signal by using the first local signal.

The time division duplex transceiver having the configuration mentioned above does not require a local signal having a higher frequency. Further, according to the time division duplex transceiver, the local signal and its harmonic components do not provide any interference with the receiving operation of the transceiver. This is because the local signal and the harmonic components thereof have frequencies which cannot be close to a receiving frequency.

Thus, the invention described herein makes possible the advantage of providing a time division duplex transceiver in which a signal having a transmitting frequency can be prevented from interfering with the receiving operation of the transceiver without requiring a local oscillator capable of generating a frequency higher than the transmitting frequency.

This and other advantages of the present invention will become apparent to those skilled in the art upon reading and understanding the following detailed description with reference to the accompanying figures.

DESCRIPTION OF THE PREFERRED EMBODIMENTS

The invention will be described in detail with reference to the accompanying drawings.

EXAMPLE 1

Figure 1:
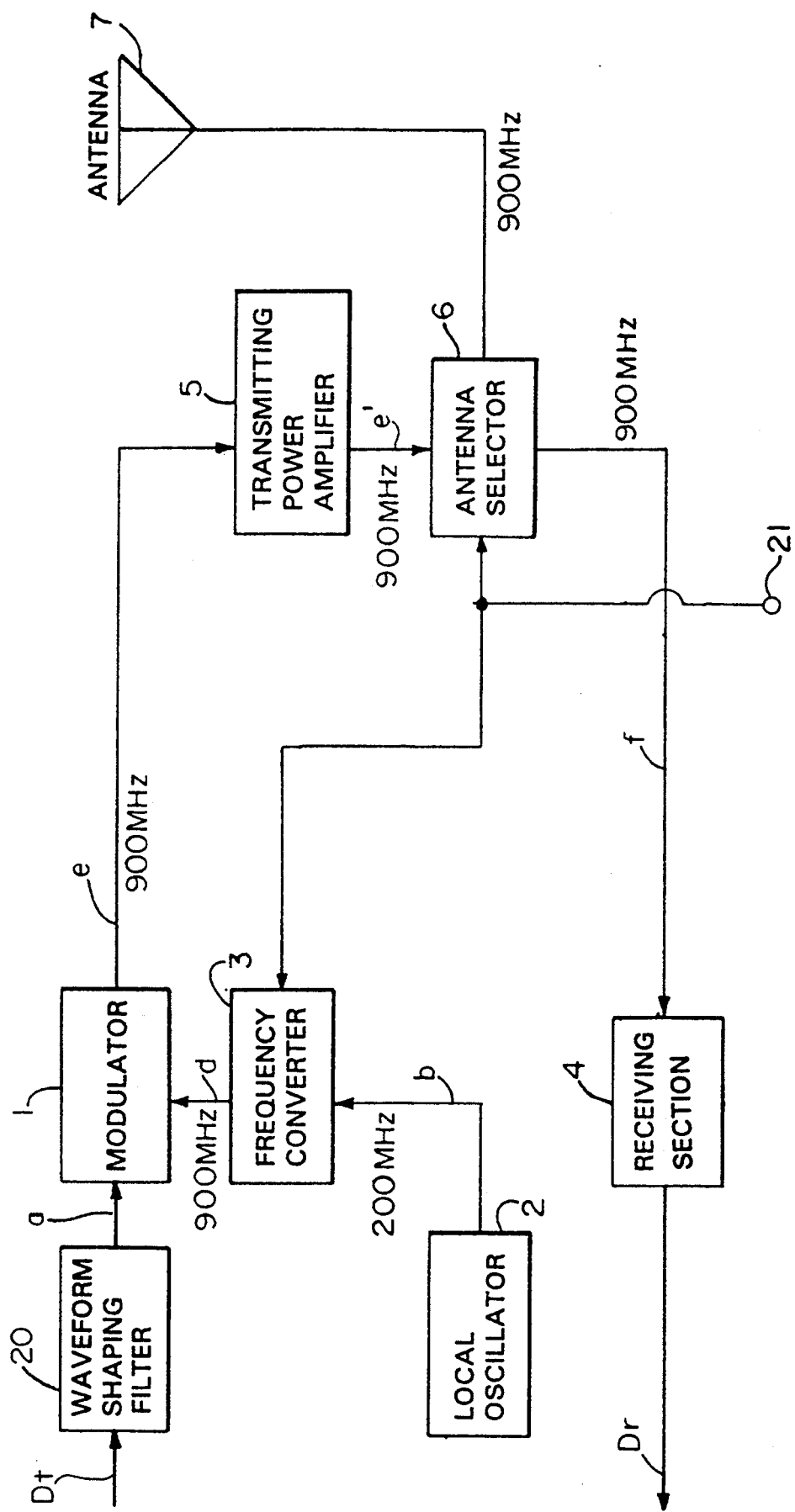
FIG. 1 is a block diagram showing a configuration for a transceiver according to the invention.

FIG. 1 shows a configuration for a time division duplex transceiver of a first example according to the present invention. The transceiver includes a modulator 1, a local oscillator 2, a frequency converter 3, a receiving section 4, a transmitting power amplifier 5, an antenna selector 6, an antenna 7 and a waveform shaping filter 20.

Hereinafter, the transmitting operation of the transceiver is described.

Figure 2:
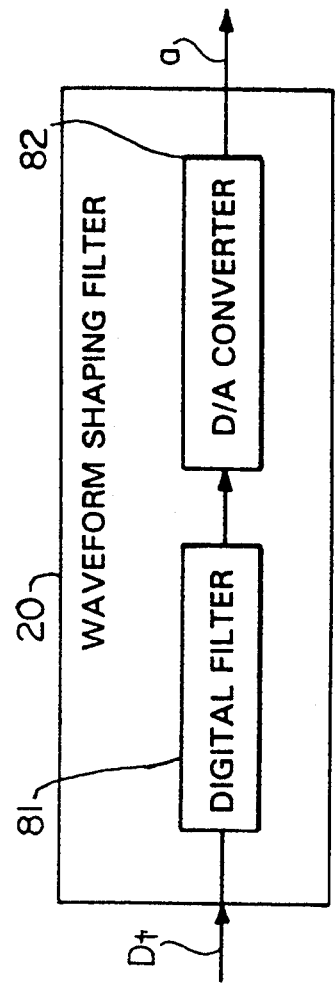
FIG. 2 is a block diagram showing a configuration for a waveform shaping filter in the transceiver of FIG. 1.

Transmitting data Dt is input to the waveform shaping filter 20. The waveform shaping filter 20 outputs a transmitting baseband signal a in accordance with the transmitting data Dr. For example, the waveform shaping filter 20 includes a digital filter 81 and a D/A converter 82, as is shown in FIG. 2.

The local oscillator 2 generates a local signal b during both the transmitting and receiving operations of the transceiver. The local signal b is supplied to the frequency converter 3. The frequency converter 3 frequency converts the signal b into a carrier signal d. As will be described in detail later, the frequency converter 3 generates the carrier signal d only during the transmitting operation of the transceiver. In the receiving operation of the transceiver, the generation of the carrier signal d is completely terminated.

The modulator I modulates the carrier signal d by the use of the baseband signal a so as to output a modulated signal e. The modulated signal e is then amplified by the transmitting power amplifier 5, resulting in a transmitting signal e'.

Through a terminal 21, a control signal is input to the antenna selector 6 and the frequency converter 3. The control signal is used to switch the transmitting operation and the receiving operation of the transceiver. In the transmitting operation of the transceiver, the antenna selector 6 is electrically connected to the transmitting power amplifier 5, so that the transmitting signal e' passes through the antenna selector 6 and is transmitted from the transceiver through the antenna 7. In the receiving operation of the transceiver, the antenna selector connected to the receiving section 4. A signal input to the antenna 7 is supplied to the antenna selector which then outputs a receiving signal f. In the time division duplex transceiver, the receiving signal f has the same frequency as that of the transmitting signal e'. The receiving signal f is supplied to the receiving section 4.

Figure 3:
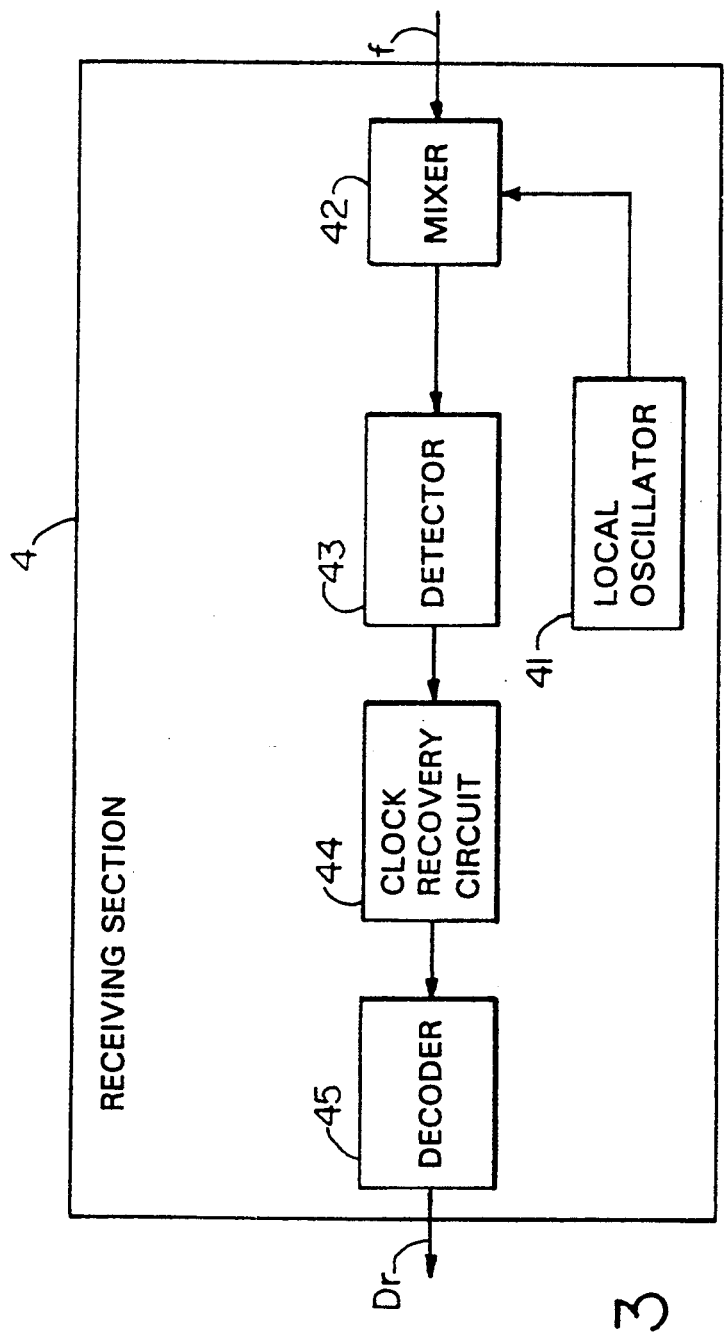
FIG. 3 is a block diagram showing a configuration for a receiving section in the transceiver of FIG. 1.

The receiving section 4 outputs receiving data Dr. The receiving data Dr is obtained by subjecting the receiving signal f to detecting and decoding processes. FIG. 3 shows a configuration for the receiving section 4. In this example, the receiving section 4 is of a superheterodyne configuration and includes a local oscillator 41, a mixer 42, a detector 43, a clock recovery circuit 44 and a decoder 45.

The local oscillator 41 generates a local signal. The local signal from the local oscillator 41 is supplied to the mixer 42. The mixer 42 mixes the receiving signal f with the local signal from the local oscillator 41. Then, the output of the mixer 42 is subjected to detection, clock recovery, and decoding in that order by means of the detector 43, the clock recovery circuit 44 and the decoder 45, respectively, resulting in the receiving data Dr.

Alternatively, the local signal b from the local oscillator 2 may be supplied to the mixer 42 instead of the local signal from the local oscillator 41.

Next, the frequency converter 3 will be described in detail.

Figure 4:
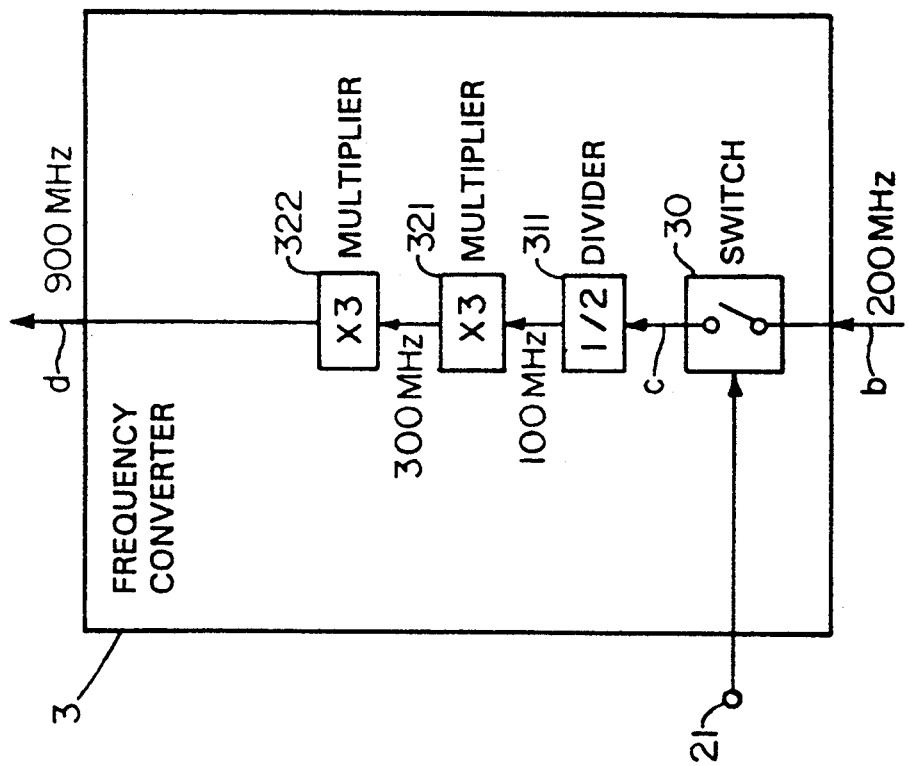
FIG. 4 is a block diagram showing an exemplary configuration for a frequency converter in transceiver of FIG. 1.

FIG. 4 shows a configuration for the frequency converter 3. The frequency converter 3 shown in FIG. 4 includes a switch 30, a divider 311 and multipliers 321 and 322.

The control signal is supplied to the switch 30 through the terminal 21. The control signal is used to control the ON/OFF-state of the switch 30. In the transmitting operation of the transceiver, the switch 30 is in the ON-state. As a result, the local signal b from the local oscillator 2 passes through the switch 30 and is supplied to the divider 311. The divider 311 outputs a signal having a frequency equal to ½ of the frequency of the local signal b. The output of the divider 311 is then multiplied by 3 in each of the multipliers 321 and 322. As a result, a carrier signal d having a frequency of 9/2 times that of the local signal b is obtained.

Thus, the frequency converter 3 includes at least one divider and at least one multiplier which are connected in series. The divider and multiplier included in the frequency converter 3 function as a fractional frequency converter. The fractional frequency converter converts a signal having an input frequency into a signal having an output frequency in such a manner that the output frequency is $n_2/n_1$ times the input frequency, where $n_1$ is an integer greater than 2, $n_2$ is an integer greater than 1, $n_1$ and $n_2$ being relatively prime. The expression of "$n_1$ and $n_2$ being relatively prime" means that $n_1$ and $n_2$ do not have any common divisors except for an integer of 1. As a result, the frequency of the transmitting signal e' is not any integral multiple of the frequency of the local signal b.

In the receiving operation of the transceiver, the switch 30 is in the OFF-state, thereby preventing the divider 311 from receiving the local signal b as its input signal c. In general, such a divider does not operate until its input signal reaches a predetermined level. Thus, in the receiving operation of the transceiver, even if the level of the signal c input to the divider 311 is not completely lowered to zero because of an insufficient isolation of the switch 30, the output of the divider 311 is completely terminated. Accordingly, the generation of the carrier signal d is completely terminated during the receiving operation of the transceiver. Further, in the receiving operation of the transceiver, the divider 311 and multipliers 321 and 322 may be disconnected from their power source.

The operation of the transceiver shown in FIG. 1 will now be described by giving specific examples of the signal frequencies.

For example, it is assumed that the local signal b has a frequency of 200 MHz. In this case, the output of the divider 311 has a frequency of 100 MHz, the output of the multiplier 321 has a frequency of 300 MHz and the output of the multiplier 322 (i.e. the carrier signal d) has a frequency of 900 MHz. As a result, the modulated signal e and the transmitting signal e' each has a frequency of 900 MHz. The receiving signal f input to the receiving section 4 also has a frequency of 900 MHz.

In the receiving operation of the transceiver, as described above, the switch 30 in the frequency converter 3 is in the OFF-state so that any components of 900 MHz, which may interfere with the receiving operation, are completely prevented from being generated. The local oscillator 2 continues to generate the local signal b in the receiving operation as well as the transmitting operation of the transceiver. Even if the local signal b or the harmonic components thereof enter the receiving section 4, they will cause no deterioration in the receiving performance of the transceiver. This is because the frequencies of the local signal b and the harmonic components thereof are equal to integral multiples of 200 MHz, and can never approach 900 MHz of the receiving signal f.

Furthermore, the transceiver can operate by using the local signal b having a frequency of 200 MHz, which is satisfactorily lower than 900 MHz of the transmitting signal e'.

Figure 5:
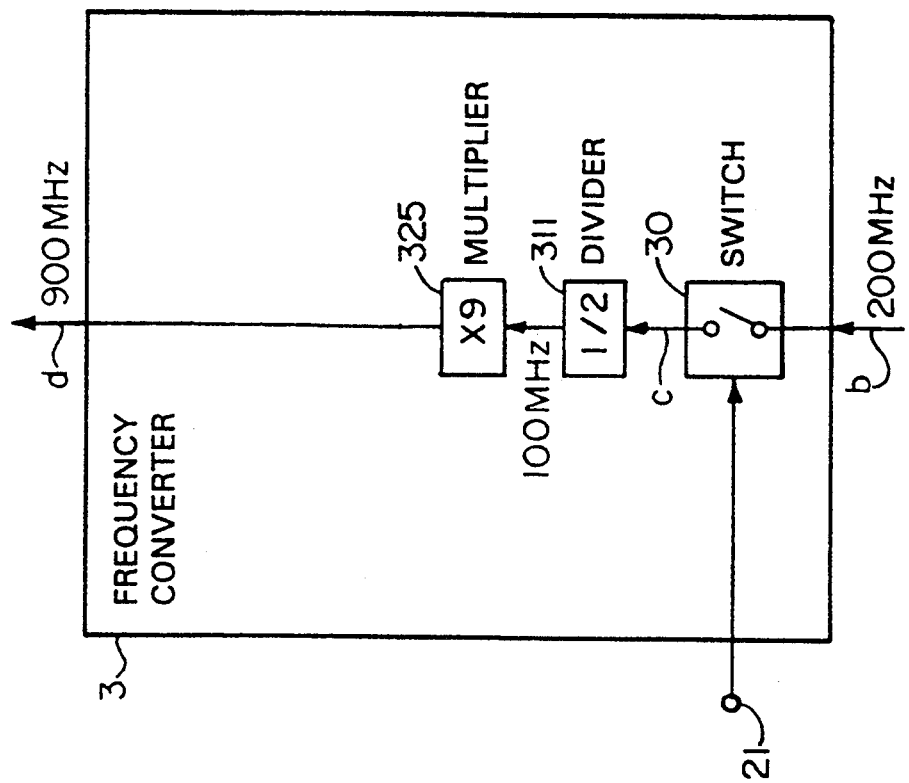
FIG. 5 is a block diagram showing another exemplary configuration for the frequency converter in the transceiver of FIG. 1.

The configuration of the frequency converter 3 is not limited to that shown in FIG. 4. For example, the frequency converter 3 may include only one multiplier 325, as is shown in FIG. 5. The frequency converter 3 shown in FIG. 5 includes a switch 30, a divider 311 and a multiplier 325.

The control signal is supplied to the switch 30 through the terminal 21. The control signal is used to control the ON/OFF-state of the switch 30. In the transmitting operation of the transceiver, the switch 30 is in the ON-state. As a result, the local signal b from the local oscillator 2 passes through the switch 30 and is supplied to the divider 311. The divider 311 outputs a signal having a frequency which is equal to ½ of the frequency of the local signal b. The output of the divider 311 is then multiplied by 9 in the multiplier 325. As a result, a carrier signal d having a frequency of 9/2 times that of the local signal b is obtained. In the receiving operation of the transceiver, the switch 30 is in the OFF-state.

With the above-described frequency converter 3 shown in FIG. 5, the frequency of the carrier signal d is 9/2 times that of the local signal b. However, a carrier signal other than the carrier signal d also can be used as long as the frequency of the carrier signal is not equal to any integral multiple of the frequency of the local signal b.

It is preferable that the frequency converter 3 has one or two multipliers, and each of the multipliers multiplies the frequency of an input signal by 3 or less. This is because, when the number of multipliers is made larger or the multiplier multiplies the frequency of the input signal by more than 3, the size of the required circuits becomes larger because of the difficulty in extracting desired components from the local signal.

Furthermore, the frequency converter 3 may include an oscillator and a mixer for further frequency conversion in addition to the divider and multiplier(s).

EXAMPLE 2

Figure 6:
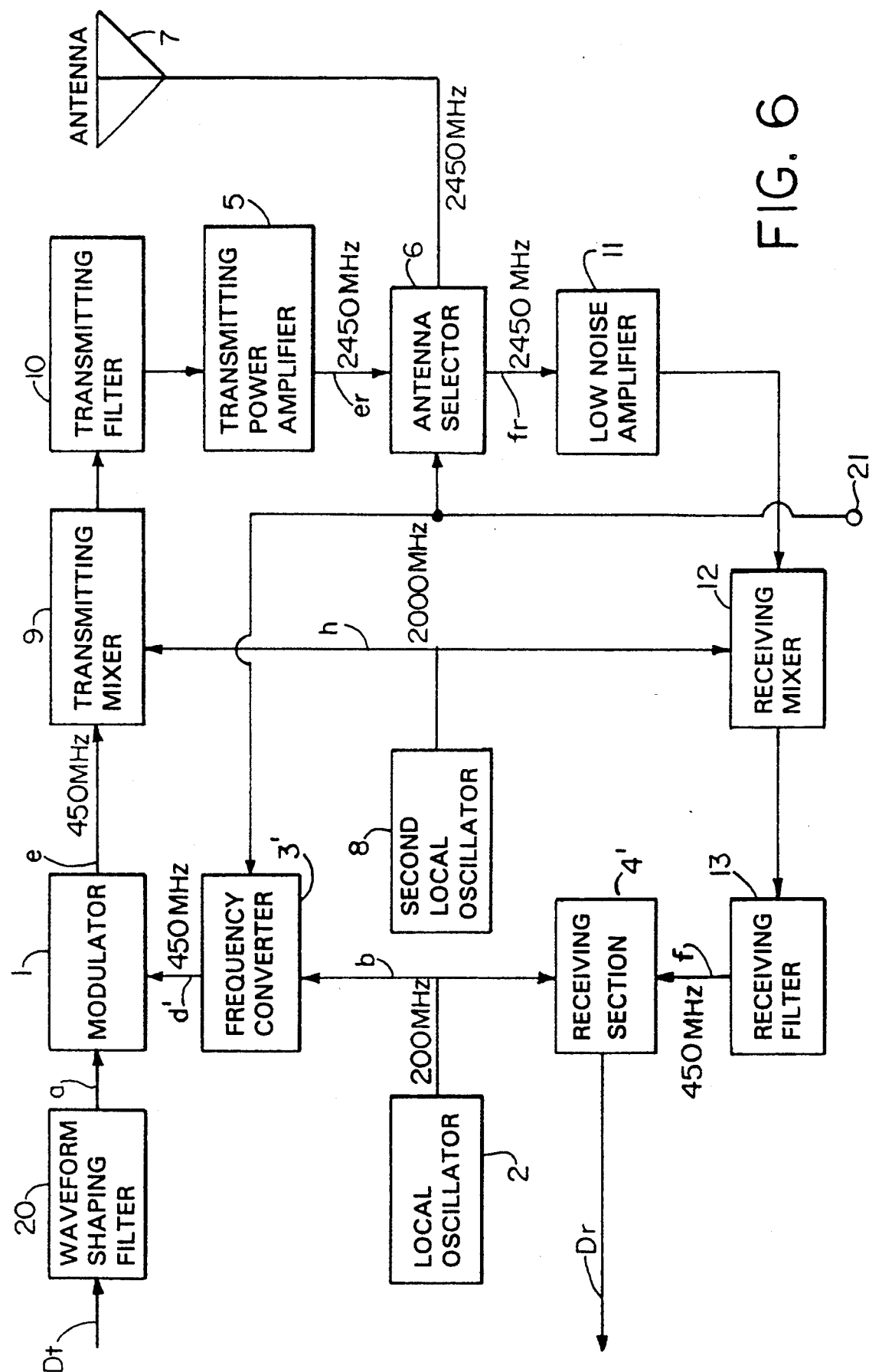
FIG. 6 is a block diagram showing another configuration for a transceiver according to the invention.

FIG. 6 shows a configuration for a time division duplex transceiver of a second example according to the present invention. The transceiver includes a modulator 1, a local oscillator 2, a frequency converter 3', a receiving section 4', a transmitting power amplifier 5, an antenna selector 6 and an antenna 7. The transceiver further includes a second local oscillator 8, a transmitting mixer 9, a transmitting filter 10, a low noise amplifier 11, a receiving mixer 12, a receiving filter 13 and a waveform shaping filter 20.

The waveform shaping filter 20 in this example is identical to that of the first example shown in FIG. 2. The configuration and operation for generating a modulated signal e is almost similar to those of the first example. However, the configuration of the frequency converter 3' in this example is slightly different from that of the frequency converter 3 in the first example.

Figure 7:
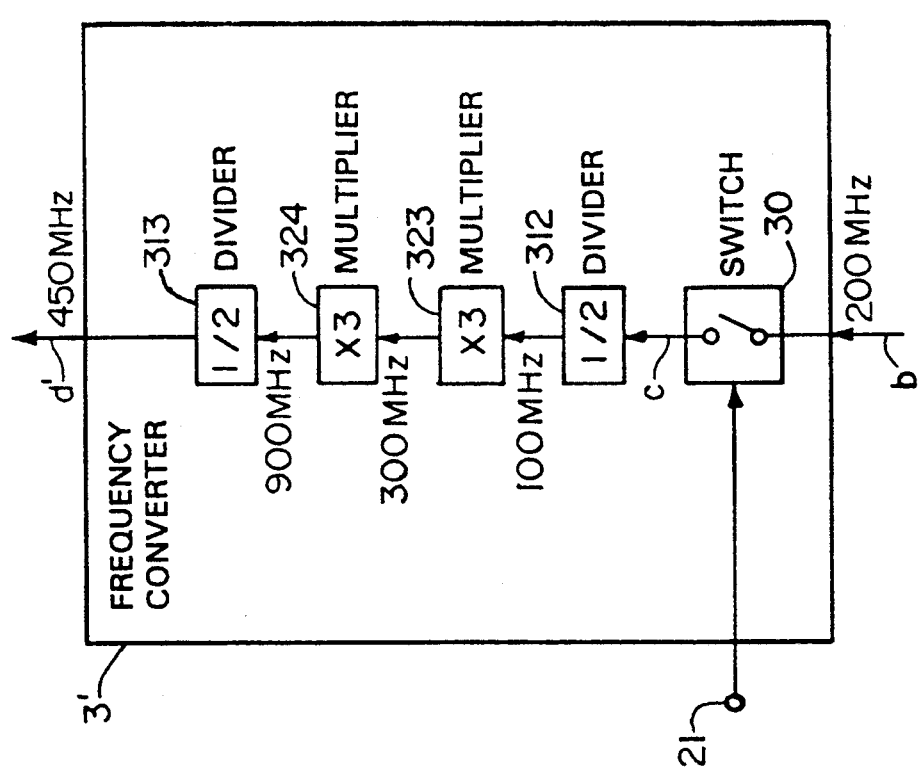
FIG. 7 is a block diagram showing a configuration for a frequency converter in the transceiver of FIG. 6.

FIG. 7 shows a configuration for the frequency converter 3'. The frequency converter 3' includes a switch 30, a divider 312, multipliers 323 and 324, and a divider 313. The frequency of a signal c input to the divider 312 is divided by 2 therein, and then multiplied by 3 in each of the multipliers 323 and 324, and thereafter divided by 2 in the divider 313. As a result, the frequency converter 3' outputs a carrier signal d' having a frequency of 9/4 times that of the local signal b from the local oscillator 2.

Thus, the frequency converter 3' includes at least one divider and at least one multiplier which are connected An series. The divider and multiplier included in the frequency converter 3' function as a fractional frequency converter. The fractional frequency converter converts a signal having an input frequency into a signal having an output frequency in such a manner that the output frequency is $n_2/n_1$ times the input frequency, where $n_1$ is an integer greater than 2, $n_2$ is an integer greater than 1, $n_1$ and $n_2$ being relatively prime. As a result, the frequency of the modulated signal e is not any integral multiple of the frequency of the local signal b.

Figure 8:
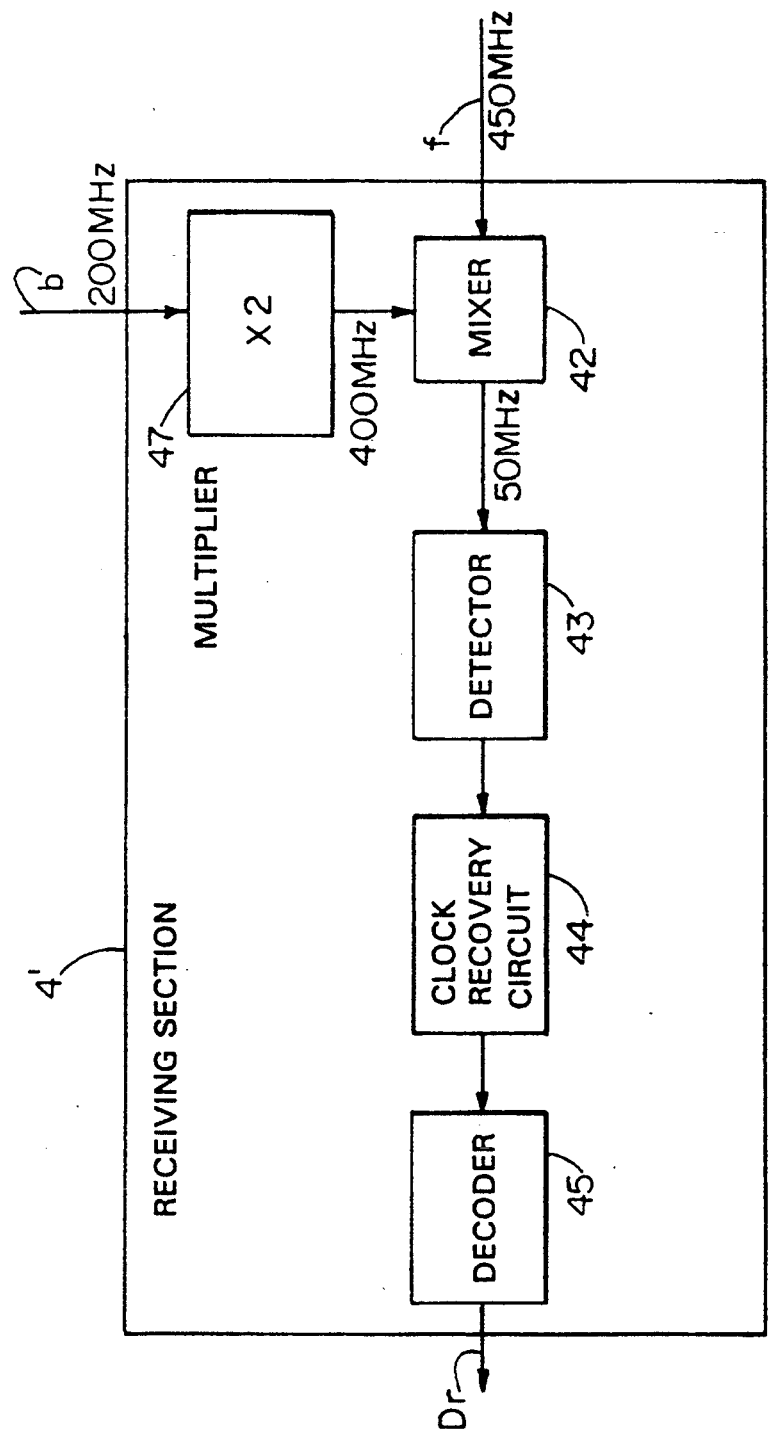
FIG. 8 is a block diagram showing an exemplary configuration for a receiving section in the transceiver of FIG. 6.

FIG. 8 shows a configuration for the receiving section 4' shown in FIG. 6. The receiving section 4' is of a superheterodyne configuration, and includes a mixer 42, a detector 43, a clock recovery circuit 44, a decoder 45 and a multiplier 47. The local signal b from the local oscillator 2 is also supplied to the receiving section 4'. The local signal b is used for frequency down conversion within the receiving section 4'.

In the transmitting operation of the transceiver, a high-frequency transmitting signal er is obtained by frequency up-converting the modulated signal e by the use of a second local signal h from the second local oscillator 8. The high-frequency transmitting signal er is transmitted from the transceiver through the antenna 7.

In the receiving operation of the transceiver, a high-frequency receiving signal fr is input to the antenna 7. A receiving signal f having an intermediate frequency is obtained by frequency down-converting the high-frequency receiving signal fr by the use of the second local signal h from the second local oscillator 8.

The transmitting mixer 9 mixes the modulated signal e with the second local signal h. The transmitting filter 10 extracts a signal having frequency components corresponding to the sum of the frequencies of the modulated signal e and second local signal h from the output of the transmitting mixer 9, and outputs the extracted signal to the transmitting power amplifier 5. The output of the transmitting filter 10 is then amplified by the transmitting power amplifier 5, resulting in the high-frequency transmitting signal er. The high-frequency transmitting signal er is transmitted from the transceiver through the antenna 7.

The high-frequency receiving signal fr is amplified by the low noise amplifier 11, and then input to the receiving mixer 12. The receiving mixer 12 mixes the amplified high-frequency receiving signal fr with the second local signal h. Thereafter, the receiving filter 13 extracts a signal having frequency components corresponding to the frequency difference between the high-frequency receiving signal fr and the second local signal h from the output of the receiving mixer 12, resulting in the receiving signal f having an intermediate frequency. The thus obtained receiving signal f is supplied to the receiving section 4'.

Next, the operation of the transceiver of this example will be described by giving specific examples of the signal frequencies with reference to FIGS. 6 and 7.

For example, it is assumed that the local signal b from the local oscillator 2 has a frequency of 200 MHz. In this case, the output of the divider 312 has a frequency of 100 MHz, the output of the multiplier 323 has a frequency of 300 MHz, the output of the multiplier 324 has a frequency of 900 MHz, and the output of the divider 313 has a frequency of 450 MHz. Thus, the carrier signal d' output from the divider 313 has a frequency of 450 MHz.

Further, it is assumed that the second local signal h has a frequency of 2000 MHz. In this case, each of the high-frequency transmitting signal er and the high-frequency receiving signal fr has a frequency of 2450 MHz. Each of the modulated signal e and the receiving signal f has a frequency of 450 MHz.

When frequency components of the carrier signal d' are generated in the receiving operation of the transceiver, the modulated signal e of 450 MHz is likely to be input to the receiving section 4'. This interferes with the receiving operation of the transceiver. Furthermore, the high-frequency transmitting signal er of 2450 MHz may be input to the low noise amplifier 11 or receiving mixer 12. This also interferes with the receiving operation of the transceiver. In the receiving operation of the transceiver, the switch 30 is in the OFF-state so as to interrupt any signal input to the divider 312. Thus, the generation of the carrier signal d' having a frequency of 450 MHz is completely terminated.

The local oscillator 2 generates the local signal b having a frequency of 200 MHz. Even if the local signal b or its harmonic components are input into a signal of 450 MHz or into a signal of 2450 MHz in the receiving operation of the transceiver, they can readily be removed from the signals of 450 MHz or 2450 MHz. This is because the frequencies of the local signal h and its harmonic components are multiples of 200 MHz.

Next, the operation of the receiving section 4' is described with reference to FIG. 8.

The multiplier 47 converts the local signal b of 200 MHz into a signal of 400 MHz. The mixer 42 converts the receiving signal f of 450 MHz into e signal having an intermediate frequency of 50 MHz by the use of the output of the multiplier 47. The signal having the intermediate frequency is sequentially processed by the detector 43, the clock recovery circuit 44 and the decoder 45, resulting in receiving data Dr.

In the second example, the configuration of the receiving section 4' is not limited to that shown in FIG. 8. For example, the receiving section 4' may have a configuration as shown in FIG. 9.

Figure 9:
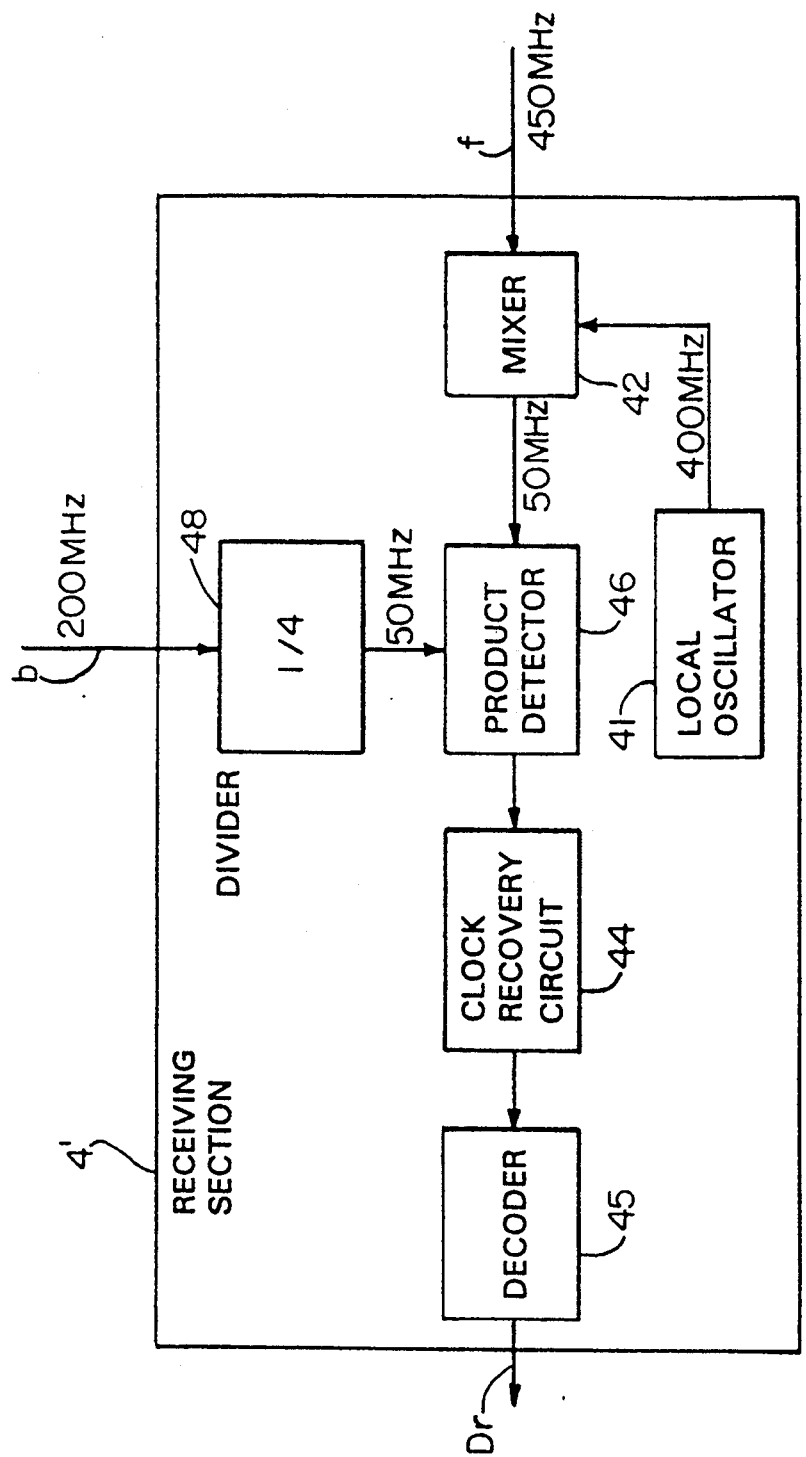
FIG. 9 is a block diagram showing another exemplary configuration for the receiving section in the transceiver of FIG. 6.

The receiving section 4' shown in FIG. 9 is of a superheterodyne configuration and includes a local oscillator 41, a mixer 42, a clock recovery circuit 44, a decoder 45, a product detector 46 and a divider 48.

The local oscillator 41 generates a local signal having a frequency of 400 MHz. The mixer 42 converts the receiving signal f of 450 MHz into a signal having an intermediate frequency of 50 MHz.

The local signal b of 200 MHz is supplied to the divider 48. The divider 41 divides the frequency of the local signal b by 4 so as to obtain a signal of 50 MHz. The product detector 46 detects the signal having the intermediate frequency of 50 MHz output from the mixer 42 by the use of the signal output from the divider 48, so as to obtain a baseband signal. The thus obtained baseband signal is sequentially processed by the clock recovery circuit 44 and the decoder 45, resulting in receiving data Dr.

As described above, the time division duplex transceiver of the present invention does not require a local signal having a higher frequency. Further, according to the time division duplex transceiver of the present invention, the local signal and its harmonic components do not provide any interference with the receiving operation of the transceiver. This is because the local signal and the harmonic components thereof have frequencies which cannot be close to a receiving frequency.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transceiver for transmitting and receiving a signal having the same frequency according to a time division, the transceiver comprising:
    a local oscillating means for generating a local signal having a first frequency;
    a frequency converting means for converting the local signal into a carrier signal;
    a modulating means for modulating the carrier signal by using a transmitting baseband signal so as to generate a transmitting signal having a second frequency; and
    a receiving means for receiving, during a receiving operation, a receiving signal having the second frequency which is the same as that of the transmitting signal,
    wherein the frequency converting means includes a fractional frequency converting means for converting a signal having an input frequency into a signal having an output frequency, the output frequency being $n_2/n_1$ times the input frequency, where $n_1$ is an integer greater than 2, $n_2$ is an integer greater than 1, $n_1$ and $n_2$ being relatively prime, whereby the second frequency of the transmitting signal is not any integral multiple of the first frequency of the local signal, and
    further comprising control means for selectively terminating operation of the frequency converting means, wherein, in the receiving operation of the transceiver, operation of the frequency converting means is terminated.

2. A transceiver according to claim 1, wherein the fractional frequency converting means includes at least one dividing means and at least one multiplying means which are connected in series.

3. A transceiver according to claim 2, wherein the termination of the operation of the frequency converting means is accomplished by the control means by terminating operation of the dividing means in the receiving operation of the transceiver.

4. A transceiver according to claim 3, wherein the termination of the operation of the dividing means is accomplished by the control means by interrupting a signal input to the dividing means in the receiving operation of the transceiver.

5. A transceiver according to claim 1, wherein the local signal is supplied to the receiving means, and the receiving means performs at least one of frequency conversion and detection of the receiving signal by using the local signal.

6. A transceiver for transmitting and receiving a signal having the same frequency according to a time division, the transceiver comprising:
    a first local oscillating means for generating a first local signal having a first frequency;
    a first frequency converting means for converting the first local signal into a carrier signal;
    a modulating means for modulating the carrier signal by using a transmitting baseband signal so as to generate a modulated signal having a second frequency;
    a second local oscillating means for generating a second local signal having a third frequency;
    a second frequency converting means for converting the modulated signal into a transmitting signal having a fourth frequency in accordance with the third frequency of the second local signal;
    a third frequency converting means for converting a receiving signal having the fourth frequency which is the same as that of the transmitting signal into an intermediate-frequency signal in accordance with the third frequency of the second local signal; and
    a receiving means for receiving, during a receiving operation, the intermediate-frequency signal,
    wherein the first frequency converting means includes a fractional frequency converting means for converting a signal having an input frequency into a signal having an output frequency, the output frequency being $n_2/n_1$ times the input frequency, where $n_1$ is an integer greater than 2, $n_2$ is an integer greater than 1, $n_1$ and $n_2$ being relatively prime, whereby the second frequency of the modulated signal is not any integral multiple of the first frequency of the first local signal, and further comprising control means for selectively terminating operation of the frequency converting means, wherein, in the receiving operation of the transceiver, operation of the first frequency converting means is terminated.

7. A transceiver according to claim 6, wherein the fractional frequency converting means includes at least one dividing means and at least one multiplying means which are connected in series.

8. A transceiver according to claim 7, wherein the termination of the operation of the first frequency converting means is accomplished by the control means by terminating the operation of the dividing means in the receiving operation of the transceiver.

9. A transceiver according to claim 8, wherein the termination of the operation of the dividing means is accomplished by the control means by interrupting a signal input to the dividing means in the receiving operation of the transceiver.

10. A transceiver according to claim 6, wherein the first local signal is supplied to the receiving means, and the receiving means performs at least one of frequency conversion and detection of the intermediate-frequency signal by using the first local signal.

* * * * *